Jan. 18, 1938.  N. B. HENRY  2,105,786
COMBINATION SEED COTTON CLEANER DRIER
Filed March 7, 1936  2 Sheets-Sheet 1

Inventor
N. B. Henry
By Mason Fenwick & Lawrence
Attorneys

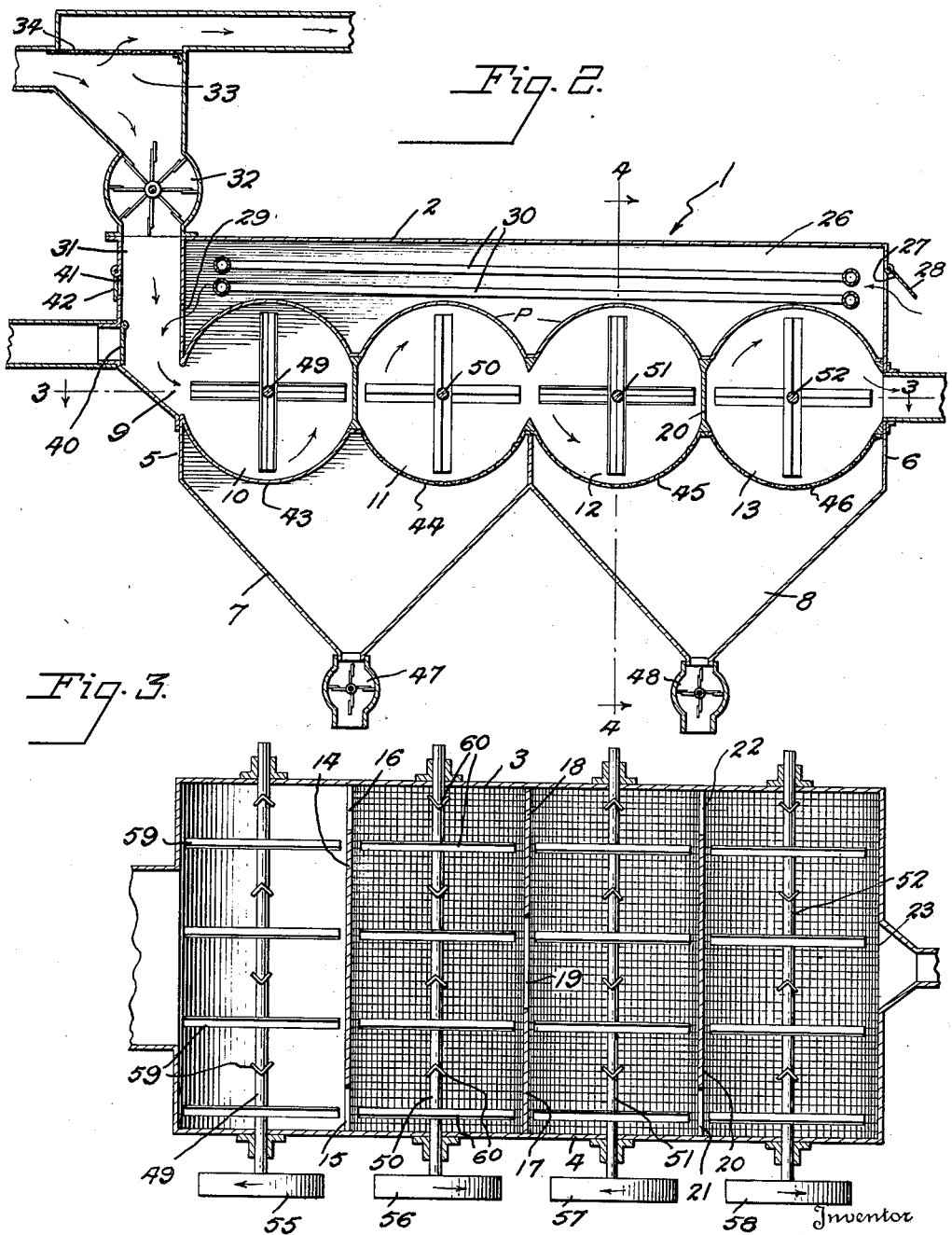

Patented Jan. 18, 1938

2,105,786

UNITED STATES PATENT OFFICE 2,105,786

COMBINATION SEED COTTON CLEANER-DRIER

Nelson B. Henry, Columbus, Ga.

Application March 7, 1936, Serial No. 67,720

7 Claims. (Cl. 19—93)

The invention forming the subject matter of this application is designed to dry and clean seed cotton during the feeding thereof from a source of supply to a separator connected to a gin battery.

The main object of the invention is to provide a combined cotton drier and cleaner in a simple compact unit which can be easily insulated against heat radiation; and which can be applied as an attachment to any gin plant by means of a pipe for conducting air and cotton to the separator of the plant.

Another object of the invention is to provide a combined drier and cleaner which maintains the heated air at substantially constant temperature during the passage thereof with the cotton through the drying and cleaning chambers.

Other objects of the invention will become apparent as the detailed description thereof proceeds.

In the drawings:

Figure 2 is a vertical longitudinal section through the combined cleaner and drier;

Figure 3 is a horizontal section taken on the line 3—3 of Figure 2; and

Figure 1:
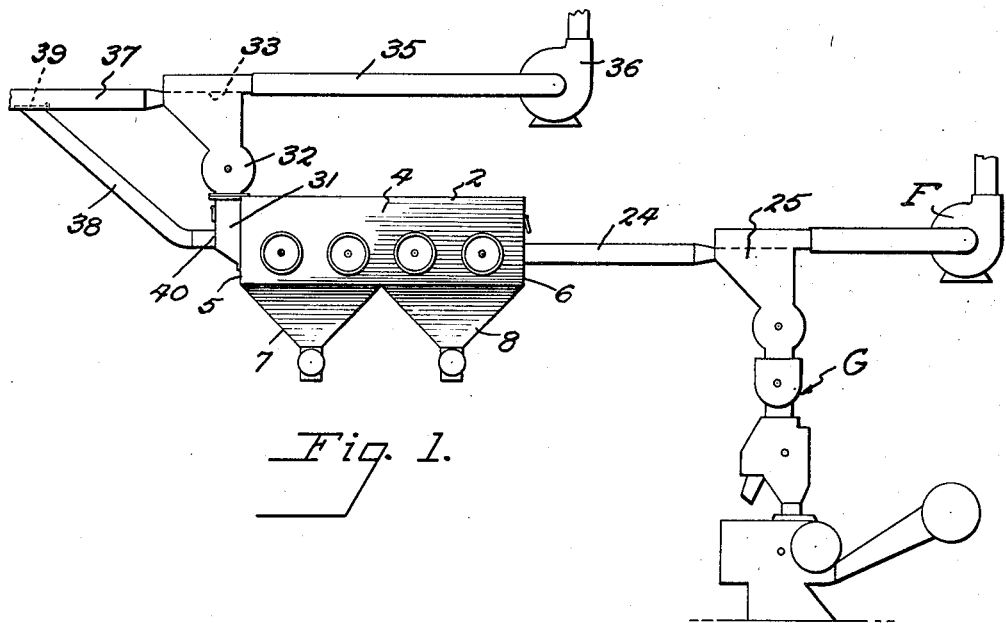
Figure 1 is a diagrammatic layout of the invention as applied to the separators of a cotton gin plant.
Figure 4:
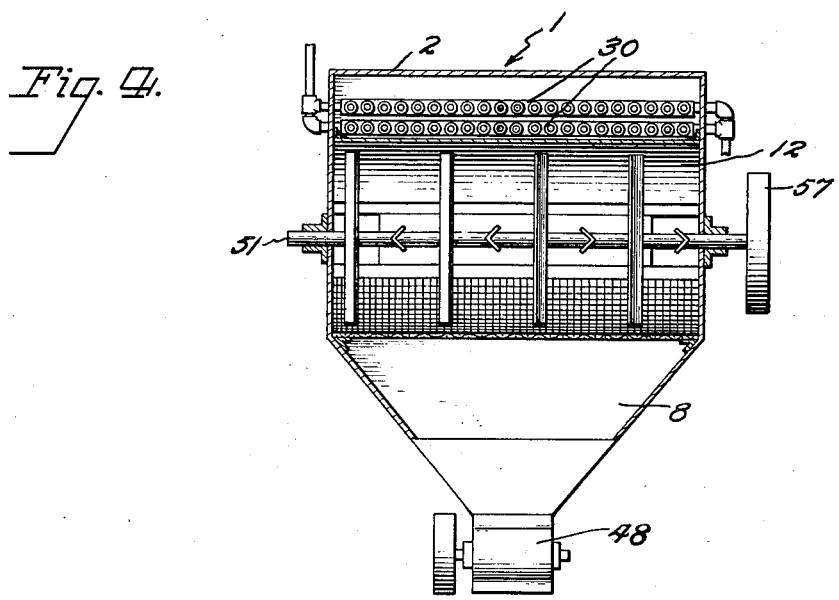
Figure 4 is a vertical transverse section taken on the line 4—4 of Figure 2.

As shown in the drawings, the invention comprises a casing designated generally by the reference numeral 1. This casing comprises a substantially rectangular top 2, side walls 3 and 4, end walls 5 and 6, and a bottom formed by hoppers 7 and 8.

The end wall 5 is provided with a slot forming the inlet opening 9 to the drying and cleaning chambers formed by a series of cylindrical casings 10, 11, 12, and 13 arranged with their axes parallel to each other and lying in a plane substantially parallel to the top 2. The casings 10 and 11 are separated by a partition 14 having its ends spaced from the side walls 3 and 4 to form passageways 15 and 16. Partitions 17 and 18 separate the casings 11 and 12, and extend from the side walls 3 and 4 to form the central passageway 19. A partition 20 separates casings 12 and 13 and has its ends spaced from walls 3 and 4 to form the passageways 21 and 22.

The end wall 6 is provided with a discharge outlet 23, which is connected by a pipe 24 to the separator 25 of the gin plant G. As shown in Figure 3, the inlet 9 and outlet 23 are centrally arranged in their respective end walls 5 and 6.

The connected upper walls of the casings 10, 11, 12, and 13 form a wave like metallic closed bottom for a heating chamber 26, the top wall of which is formed by the top 2. A cold air inlet 27 is formed in the upper part of end wall 6, and is provided with a valve 28 to control the admission of cold air into the chamber 26. The other end wall 5 is provided with an outlet 29 for air drawn through chamber 26 and heated by contact with the heater pipes 30 suitably supported in chamber 26 and connected to any suitable source of heat.

A feed casing 31 is mounted on the end wall 5 to enclose the openings 9 and 29 in end wall 5. The upper end of the casing 31 is connected to the air seal dropper 32 of a separator 33, provided with the usual screen 34; and connected by a pipe 35 to the suction fan 36, which, as usual, serves to draw seed cotton from a truck or other source of supply to the separator 33 through the pipe 37.

A by-pass pipe 38 connects the pipe 37 to the casing 31 at a point adjacent the inlet opening 9. Valves 39 and 40 at opposite ends of the pipe 37 control the by-pass operation.

A cold air aperture 41, controlled by valve 42, is formed in the casing 31 above the by-pass valve 40 and is intended to admit cold air into the casing 31 whenever it becomes necessary or desirable to reduce the temperature of the air passing through the drying and heating chambers.

The lower wall 43 of the cylindrical chamber 10 is a plain metal sheet, while the lower walls 44, 45, and 46 of the chambers 11, 12, and 13 are formed by screens, which may be perforated sheet metal. This construction effects a substantial drying of the cotton in chamber 10, before it is subjected to the rubbing or machining action of the cleaning screens in chambers 11, 12, and 13. Wet cotton is always damaged by passage over the usual cleaning screens, and should always be dried to some extent before cleaning. The trash and dirt dropping through the screens into the hoppers 7 and 8 are discharged through the usual air seal droppers 47 and 48.

Beater shafts 49, 50, 51, and 52 project through and are journaled in suitable bearings in the side walls 3 and 4. Pulleys 55, 56, 57, and 58 secured to the shafts 49, 50, 51, and 52, respectively, are rotated in the directions indicated by the arrows in Figure 3 by belting (not shown) connected to any suitable driving mechanism.

The beater shaft 49 has secured thereto a series of angle iron beater bars 59 arranged so as to force the cotton in opposite directions from the center of the chamber 10 toward the passageways 15 and 16. The beater shaft 50 in chamber 11 has similar beater bars 60 secured to the shaft in such manner as to force the cotton, received from the chamber 10, from the outer ends of the said chamber 11 through the central aperture 19.

The beater shafts 51 and 52 are provided with angle iron beater bars arranged in the same manner as the bars in chambers 10 and 11, respectively, to force the cotton from the central part of chamber 12 toward the outer ends of the chamber 12, and thence through the outlet 23 at the center part of chamber 13. This tortuous path of the cotton through the cleaning chambers would continue through as many pairs of adjacent chambers as might be found necessary or desirable in the drying and cleaning operation.

In addition to the lateral movements of the cotton just described, the cotton also travels in a wave-like motion from the inlet 9 to the outlet 23 of the drying and cleaning unit. This will be apparent from inspection of Figures 2 and 3 of the drawings in which the direction arrows indicate the wave-like movement of the cotton.

The operation of the apparatus is substantially as follows: The fan 36 draws a current of air through the separator 33 and the pipe 37 connecting it to a source of supply of seed cotton. This mechanism is well-known in the art, and forms no part of the present invention. The vacuum wheel in the dropper 32 removes the cotton and drops it into the casing 31 leading to the inlet opening 9 of the cleaner-drier, without permitting the entrance into the drier of any appreciable amount of outside air.

The fan F is connected to the separator 25 which delivers cotton to the conventional distributor located over a battery of gins designated generally by the reference numeral G. When the heater is in operation the valve 28 will be opened and the valve 40 of the by-pass 38 will be closed. The air from the outside is then sucked by the fan F over the heater pipes 30 in the chamber 26, and through the openings 29 and 9 into the cylindrical drying chamber 10.

The heated air from the chamber 26 encounters the cotton dropped from the separator 33, and moved with the cotton into the preliminary heating chamber 10. In this chamber 10 it will be apparent that the moving cotton contacts only with hot smooth surfaces, during which time it is in intimate contact with the heated air. In the cleaning chambers 11, 12, and 13, the cotton is rotated over the screens 44, 45, and 46, which remove a large part of the dirt, foreign matter, etc., partly by centrifugal force, and partly by frictional contact. The cotton and heated air, with absorbed moisture, pass out of the cleaner-drier through the pipe 24 directly to the separator 25 over the gin battery G, where the air is immediately separated from the cotton and passes through the fan F to the outside of the gin building.

It is to be noted that the casing forming the upper parts of the cylinders 10, 11, 12, and 13 is heated by the passage of the hot air on the way to the opening 29. This casing being of metal, conducts heat to the inner surface thereof, so that the cotton passing through the several stages of drying and cleaning remains in intimate contact with the hot surface. This arrangement supplies additional heat to the cotton and air passing through the several chambers, and the temperature of the air does not drop materially as it absorbs moisture from the cotton.

By referring to Figures 1 and 2, it will be apparent that the unit may be used for cleaning purposes only. In this case, the air inlet valve 28 to the heating chamber, will be closed, and the valves 39 and 40 of the by-pass will be opened. When used in this manner, it will be obvious that the fan 36 and the separator 33 connected thereto, will be out of operation.

In order to increase the heat absorbing and radiating surfaces of the wave-like casing or partition P in the several chambers, this casing may be provided with fins or other means to effect this result; or the casing may be corrugated for this purpose, if found desirable. Since this cleaner-drier unit is not connected directly with the gin outfit, it can be easily installed in existing gin plants without disturbing the machinery thereof.

The arrangement of the heating chamber directly above the drying and cleaning chamber has the effect of maintaining the temperature in the last named chamber substantially constant throughout the length thereof. It will be evident from Figure 2 of the drawings, that as the cold air enters the inlet 27 it reduces the temperature of the heater pipes at the said inlet end. At the same time, the cotton at the other end of the casing is at atmospheric temperature, and likewise reduces the temperature of the other end of the heater pipes. It therefore appears that the heating chamber is subjected simultaneously at its opposite ends to the same temperature reducing conditions; and this results in maintaining the temperature of the drier and cleaner substantially constant throughout the entire length.

What I claim is:

1. A cotton gin outfit including a separator, a cotton drier connected to said separator and comprising: a casing having an inlet at one end and an outlet at the other end connected to said separator, a partition above said inlet and outlet dividing the casing into heating and drying chambers, said heating chamber having a valve controlled cold air inlet in the outlet end of the casing and a hot air outlet in the inlet end of the casing, means for moving cotton through the drying chamber to said separator, and means on the gin outfit for drawing air through the heating chamber in counterflow to the movement of the cotton in the drying chamber and in drying contact with said cotton and in the same direction in the drying chamber.

2. The combination of the apparatus set forth in claim 1, with means for cleaning the cotton during its movement in the drying chamber toward said separator.

3. A cotton drier and cleaner comprising a casing having a cotton inlet at one end and a discharge outlet at the other end, a series of cylindrical chambers formed in said casing between the inlet and outlet thereof, beaters rotatable in said chambers to move the cotton in opposite directions axially in each chamber and spirally across the axes of said chambers, and means for drying the cotton during its movement through said chambers.

4. A cotton drier and cleaner comprising a casing having an inlet at one end and a discharge outlet at the other end, a series of cylindrical chambers formed in said casing with their axes parallel to each other and extending perpendicularly to the direction of movement of the cotton between said inlet and outlet, means in said chambers for moving the cotton in opposite directions axially in each chamber and transversely of said axes and in oppositely rotating spirals from said inlet, toward said outlet, and means for drying the cotton during its movement through said chambers.

5. A cotton drier and cleaner comprising a casing having an inlet at one end and a discharge outlet at the other end, a series of cylindrical chambers formed in said casing with their axes parallel to each other and extending perpendicularly to the direction of movement of the cotton between said inlet and outlet, means in said chambers for moving the cotton in opposite directions axially in each chamber and transversely of said axes and in oppositely rotating spirals from said inlet, toward said outlet, and means for drying the cotton during its movement through said chambers, the chamber adjacent the inlet end being adapted partly to dry the cotton only, and the other chambers being adapted to clean and complete the drying of the cotton.

6. A cotton drier and cleaner comprising a casing, a heat conducting partition extending through said casing, means for beating and moving cotton in one direction through said casing, and in contact with one side of said partition, means for forcing a current of air along the other side of said partition in a direction opposite to the general direction of movement of the cotton and around said partition to mix with said cotton, and means for heating the air during its movement along said other side.

7. A cotton cleaner and drier comprising a casing having a heat conducting partition extending therethrough, means for forcing a current of air along opposite sides of said partition, means for heating the air during its flow along one of said sides, and means for moving cotton through said casing along with the heated current of air and in contact with the other of said sides.

NELSON B. HENRY.